(12) United States Patent
Nielsen

(10) Patent No.: US 6,405,243 B1
(45) Date of Patent: Jun. 11, 2002

(54) METHOD AND SYSTEM FOR UPDATING EMAIL ADDRESSES

(75) Inventor: Jakob Nielsen, Atherton, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/628,415

(22) Filed: Apr. 5, 1996

(51) Int. Cl.[7] ............................................. G06F 15/16
(52) U.S. Cl. ....................................... 709/206; 709/207
(58) Field of Search ........................ 395/200.36, 200.37, 395/200.75, 200.72; 379/90.01, 100.08, 93.24; 370/351; 709/206, 207

(56) References Cited

U.S. PATENT DOCUMENTS

| | | | | |
|---|---|---|---|---|
| 5,210,869 A | * | 5/1993 | Williams | 395/185.01 |
| 5,261,052 A | * | 11/1993 | Shimamoto et al. | 395/200.36 |
| 5,493,614 A | * | 2/1996 | Chaum | 380/30 |
| 5,518,122 A | * | 5/1996 | Tilles et al. | 209/539 |

OTHER PUBLICATIONS

IC Group, "Lifetime E–Mail Service Introduced "), pp. 1–8, Mar. 7, 1995.*
Procmailex(5), "Program Summary" Oct. 1995.*
Paula Rooney, "C2C Systems Posts E–Mail Redirect Server", PC Week v12 n42 p49, Oct. 23, 1995.*

* cited by examiner

Primary Examiner—Zarni Maung
(74) Attorney, Agent, or Firm—McDermott, Will & Emery

(57) ABSTRACT

Embodiments of the present invention provide a network-based method and system for forwarding an email message to an updated email address. After a user changes his or her email address, the user sends information regarding the updated email address to an address-change server used in conjunction with the present invention. The address-change server stores the updated email information in its database. When a sender wants to reach a recipient whose email address has changed, the sender sends an email message to the address-change server. The address-change server forwards the updated email address to the sender. The sender's email program, modified in accordance with the present invention, programmatically forwards the sender's email message to the recipient's new email address.

27 Claims, 5 Drawing Sheets

METHOD AND SYSTEM FOR UPDATING EMAIL ADDRESSES

FIELD OF THE INVENTION

The present invention relates to an improved method and system for updating email addresses.

BACKGROUND OF THE INVENTION

Users of electronic mail ("email") often change their email address. They may change their email address because they get a new job, because they change their home Internet access subscription to a new Internet access provider, or because they change their network configuration by moving their email account to a different server. When other users (called "senders") try to send an email to a person who has changed their email address (called a "recipient"), they normally get an obscure error message from the network that has no indication of the recipient's new email address. There is currently no Internet-wide directory that can be used to find the recipient's new email addresses.

Senders instead rely on system administrators to find the recipient's new email address. Some system administrators maintain email forwarding for previous users of the organization's system. For example, when a message comes in to the organization's system for a recipient that no longer uses the organization's system, the system administrator manually sends the message on to the user's new email address on the user's new system, instead of (as is normally done) sending the message to the user's mailbox on the organization's system.

Relying on a system administrator of a previous organization's system has three problems. First, it operates at the pleasure of the system administrator at the recipient's old site, and there is no guarantee that all system administrators will be sufficiently competent to set up and maintain mail forwarding, especially since servicing former users will typically take a lower priority than servicing current users. Second, some organizations may not allow system administrators to dedicate computer resources to helping former users. Third, if the message recipient has changed his or her email address multiple times, then the message will have to be forwarded multiple times. Each time the message is forwarded it causes delays, uses up system and network resources, and increases the risk that the message will not reach the recipient.

Embodiments of the present invention provide a method and system for forwarding email messages that overcomes the deficiencies of the prior art.

SUMMARY OF THE INVENTION

Embodiments of the present invention provide a network-based method and system for forwarding an email message to an updated email address. After a recipient changes his or her email address, the recipient sends information regarding the updated email address to an address-change server used in conjunction with the present invention. The address-change server store the updated email information in its database. When a sender wants to reach a recipient whose email address has changed, the sender transmits an email message to the address-change server. The address-change server retrieves the recipient's new email address and forwards the new address to the sender. The sender, in conjunction with the sender's email program, forwards the old email message to the recipient's new email address. In another embodiment, the sender's email program automatically retrieves the recipient's new email address from the address-change server's message and programmatically forwards the sender's old email message to the recipient's new email address.

Notations and Nomenclature

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these-quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview of the Preferred Method

Embodiments of the present invention provide a network-based method and system for forwarding an email message to an updated email address. After a recipient changes his or her email address, the recipient sends information regarding the updated email address to an address-change server used in conjunction with the present invention. The address-change server stores the updated email information in its database. When a sender wants to reach a recipient whose email address has changed, the sender sends an email message to the address-change server. The address-change server sends a reply email to the sender with the recipient's updated email address using the information stored in the database. The sender identifies the recipient's updated email address, creates a new email message, inserts the recipient's updated email address into the "To" line of the new message, and sends the new message to the recipient.

Overview of the Preferred System

Figure 1:
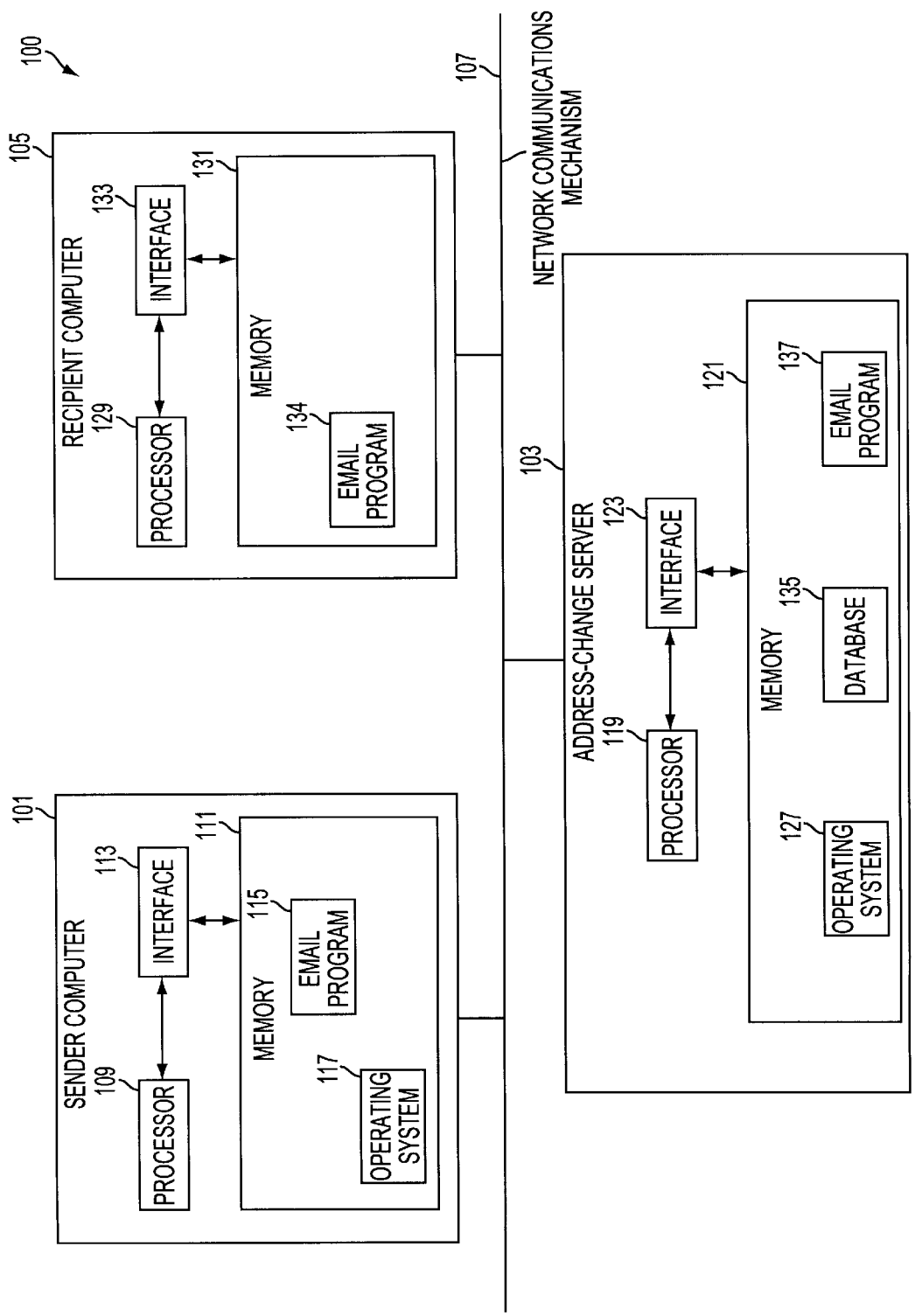
FIG. 1 is a block diagram of a network computer system for practicing the preferred embodiment of the present invention.

FIG. 1 is a block diagram of a network computer system 100 for practicing the preferred embodiment of the present invention. The computer system 100 includes a sender computer 101, an address-change server 103, a recipient computer 105, and a network communications mechanism 107.

The sender computer 101 includes a processor 109, a memory 111, and an interface 113 for facilitating input and output in the sender computer 101. The memory 1 11 stores a number of items, including an email program 115 and an operating system 117. The preferred operating system is the Solaris™ operating system from Sun Microsystems, Inc.

The address-change server 103 includes a processor 119, a memory 121, and an interface 123 for facilitating input and output in the address-change server 103. The memory 121 stores a number of items, including an operating system 127. The preferred operating system is the Solaris operating system from Sun Microsystems, Inc. of Mountain View, Calif.

The recipient computer 105 includes a processor 129, a memory 131, and an interface 133 for facilitating input and output in the recipient computer 105. The memory 131 stores a number of item, including an email program 134.

The network communications mechanism 107 provides a mechanism for facilitating communication between the sender computer 101, the address-change server 103, and the recipient computer 105.

It should be noted that the sender computer 101, the address-change server 103, and the recipient computer 105 may all contain additional components not shown in FIG. 1. For example, each computer could also include some combination of additional components including a video display device, an input device, such as a keyboard, mouse, or pointing device, a CD-ROM drive, and a permanent storage device, such as a disk drive.

Operation of the System

A preferred operation of the invention is perhaps best described by way of example. First, use of the preferred address-change server will be described. Next, mail forwarding features of preferred modifications to be made to the sender's email program will be described.

Updating A Recipient's Email Address

In a first embodiment, the network-based address-change server is used everytime a user changes his or her email address and wants others to be able to easily find the new email address. The recipient, using email program 134, transmits an update email address message ("update message") to the address-change server. The update message preferably contains the following fields of information: a) an old email address b) one or more variants of the old email address (e.g., if the old address was jakob@eng.sun.com, then a variant might be jakob@hugin.eng.sun.com) c) a new email address, and d) an indication of whether the user wants to pay for the mail-forwarding service, and if so, the preferred payment method. Optionally, the system can use digital signatures to authenticate the sender of the update message. The preferred authentication mechanism for digital signatures is public key encryption using RSA from RSA Labs.

Figure 2:
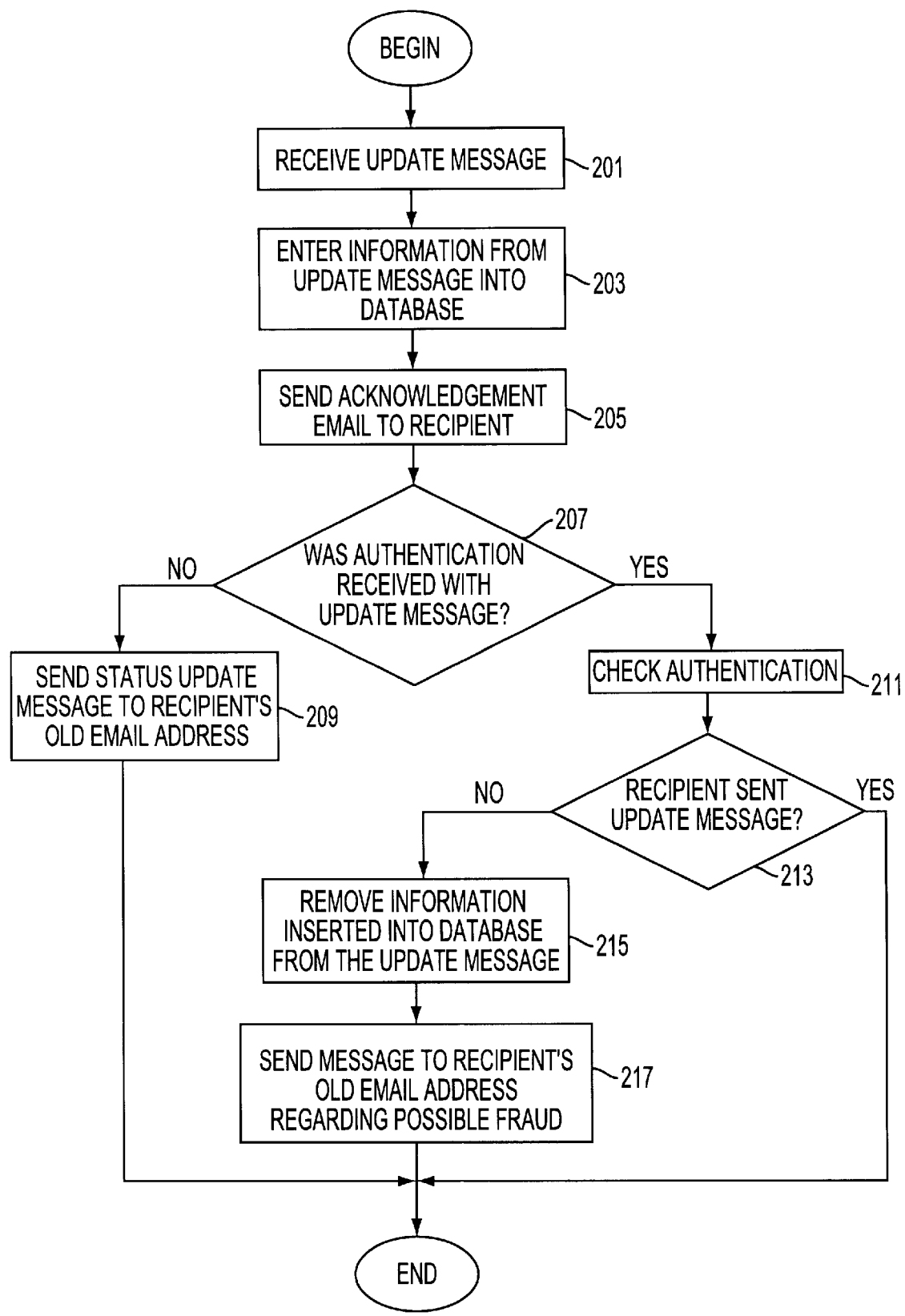
FIG. 2 illustrates the preferred steps taken by the address change server in response to receiving an updated message from the recipient.

FIG. 2 illustrates the preferred steps taken by the address change server in response to receiving an update message from the recipient. Upon receiving the update message, using an email program 137 (step 201), the address-change server enters the information from the update message into a database 135 (step 203) and sends an acknowledgment email message to the recipient computer 105 (step 205) using the new email address from the update message. If an authentication, (e.g. a digital signature), was not received to affirm the recipient's identity (step 207), then the address-change server also sends an email to the recipient's old email address with a message stating that a request has been received to enter a forwarding email address for the old email address (step 209). In case of fraud, the user at the old email address thus has an opportunity to let the mail-forwarding service know that it should delete the erroneous forwarding information.

If a digital signature was received to affirm the recipients identify (step 207), then the digital signature is checked to determine if the recipient actually sent the update message (step 211). If the recipient did not send the update message (step 213) then the information inserted into the database 135 from the update message (step 215) is removed, and incoming email messages for the recipient are not forwarded to the new email address indicated in the update message. Furthermore, the address change server transmits an email message to the recipient's old email address indicating that a fraudulent request to update the recipient's email address was received (step 217).

Note that participation in the service is preferably free to the recipient of a forwarded email message (to encourage a large database of updated email addresses), but that the recipient may nevertheless choose to pay for the service in order to allow senders to retrieve mail-forwarding information free of charge.

Embodiments of the present invention preferably keep a relational database with a record for each old email address or variants of the old email address of the recipient. Other embodiments could implement the teachings of the invention using other types of (e.g., object oriented) databases. The database 135 preferably has the following fields: a) the old email address of the recipient b) the new email address of the recipient c) a contact email address (may not be the same as the new email address for recipients who have support staff to help them with their email), and d) an account for paying for queries (which may be "none").

Embodiments of the present invention also keep a relational database with a record for each account. The database 135 preferably has the following additional fields: a) contact email address b) payment method for replenishing the account (for example, "charge my First Virtual account $30") c) amount of money available in the user's account to pay for replies to email forwarding requests (may be $0).

At any time, a participant in the service (i.e., a recipient) can send the address-change server an email message asking that no further charges be made to his/her account, in which case senders would have to pay for forwarding information.

Using the Address-Change Server to Forward an Email Message

Figure 3:
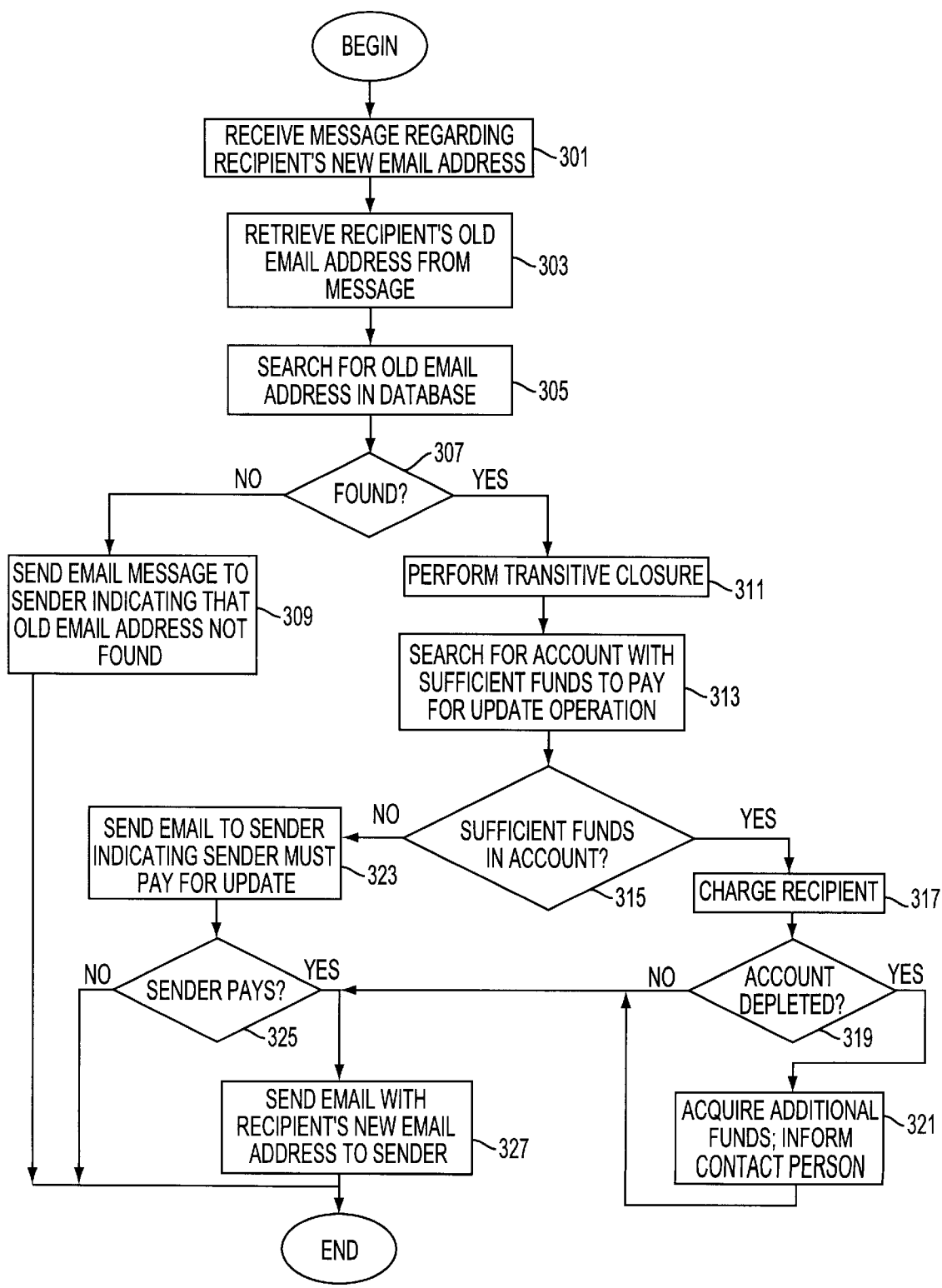
FIG. 3 illustrates the preferred steps taken by the address-change server in response to a sender's request to find a new email address of a recipient.

When a sender wants to find out the new email address of a recipient, he or she sends an email message to the address-change server. The message body should include the recipient's old email address prefaced by a keyword. The preferred keyword is "LOOKUP". FIG. 3 illustrates the preferred steps taken by the address-change server in response to a sender's request to find a new email address of a recipient. The address-change server receives the sender's message (step 301), retrieves the old email address from the email message (step 303) and then searches for the old email address in its address forwarding database (step 305). If the old email address is not found in the database (step 307), it sends an email message to the sender to that effect and ends the transaction (step 309). If the old email address is found in the address forwarding database (step 307), then the server performs a transitive closure operation by looking up the given new email address in its database as a possible old email address (step 311). In other words, if a person has changed email addresses several times, then the server keeps looking for new addresses until it finds the most recent one in its database. While looking up the fields in its database, the address-change server searches for an account, associated with one of the new email addresses, that holds enough money to pay for the update operation (step 313). If such an account is found (step 315), the user gets the new email address for free. In other words, if enough money is available in one of the recipient's accounts, the address-change server sends the user an email message with the new email address and deducts the transaction fee from the recipient's account (step 317).

If the account is depleted by this transaction (step 319), the server uses the payment method indicated in its database to acquire additional funds and sends a message to the contact email address with information about the charge (step 321). If there was not enough money available in the account to pay for the update service (step 315), then the address-change server sends the sender an email message reiterating that the sender has requested the recipients new email address but that the sender will have to pay a transaction fee to get the new email address (step 323). Assuming that the sender is willing to pay for the service (step 325), the sender sends a reply message to the address-change server with the requested amount of money.

Currently, the recommended method for sending this money is to use a First Virtual account (http://www.fv.com) since the transaction fee is expected to be less than one dollar. The system verifies the user's payment information using the First Virtual payment information. For example, the sender provides a valid First Virtual account number. The system sends First Virtual an email message with the account number and receives a message back saying that it is a valid account number. The system then takes the appropriate action to collect its money, for example, by sending an invoice email for the appropriate amount to First Virtual's server. First Virtual then sends a confirmation message to the sender and transfers the money from the sender's account to the system's account. Once the transaction fee is collected, the system sends the sender an email message with the recipient's new email address (step 327).

When the sender receives the email message with the recipient's new email address, the sender creates a new email message using the sender's email program. Then the sender inserts the recipient's new email address in the "To" line of the new email message, and sends the new email message to the recipient.

Modified Email Program for Automated Email Forwarding

Figure 4:
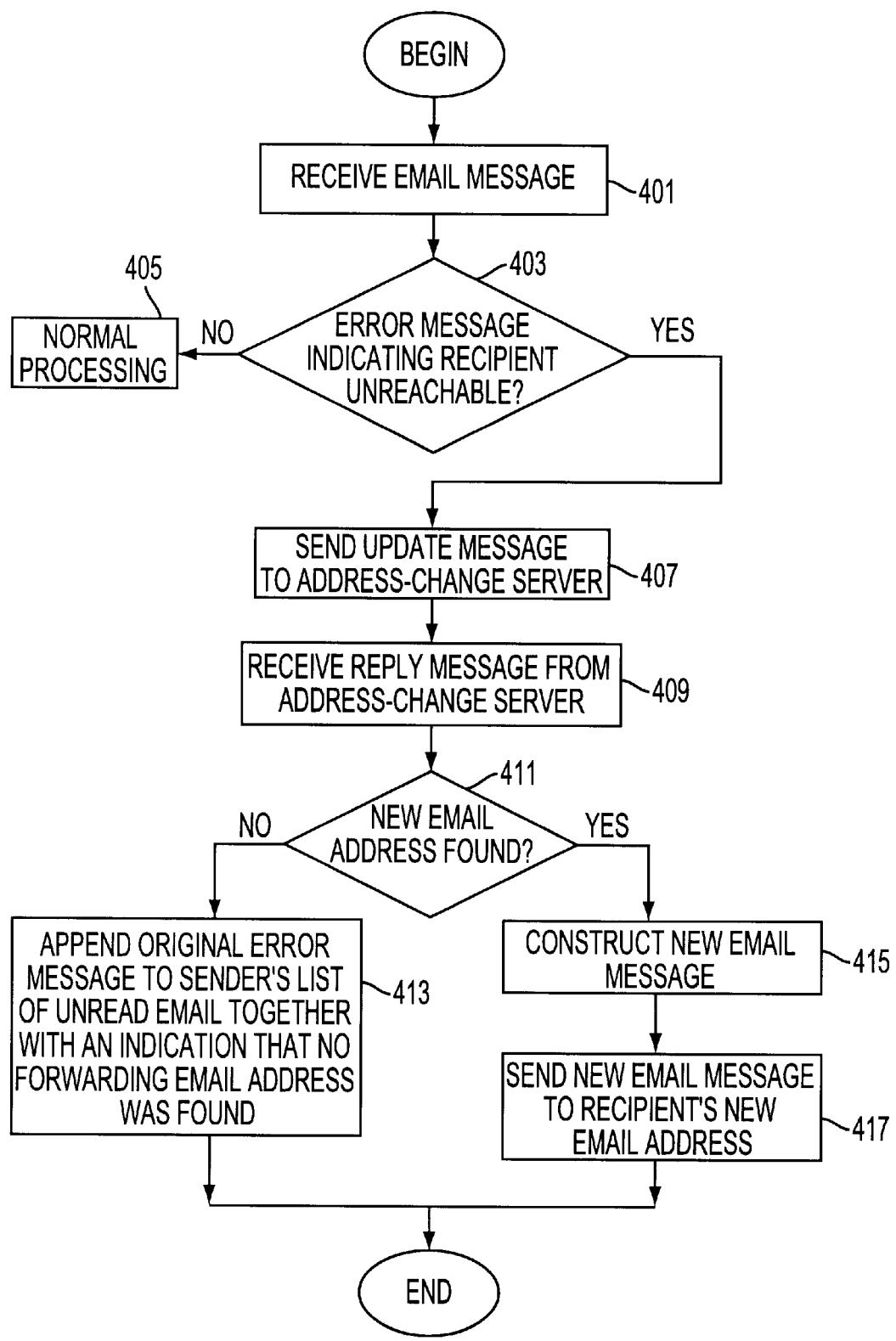
FIG. 4 illustrates the preferred steps performed by an email program modified according to the present invention, to forward an email message to a recipient's new email address.

Instead of requiring the user to manually send messages to and read messages from the address-change server, the user's email program can be modified according to the present invention to programmatically perform these tasks. FIG. 4 illustrates the preferred steps performed by an email program modified according to the present invention, to forward an email message to a recipient's new email address. Whenever the sender's email program receives a message from the network (step 401), it checks whether it is an error message of the type "userid unknown" or "hostname unknown"(step 403). In one embodiment, the modified email program determines if it has received an error message by matching the first few lines of the received message to a list of the most common wordings for these error messages. If a match is found then the email program has received a "recipient unreachable" error message. If a match is not found, then normal error processing occurs (step 405).

In a preferred embodiment, when it receives an error message, the email program does not immediately display it to the user but instead attempts to find the forwarding email address for the recipient by automatically sending a "request for email address update" message to the address-change server (step 407). For example, the email program sends a message to the address change server which includes the recipient's old address (extracted from the "To:" header in the part of the error message that repeats the headers of the original message). Assuming that the sender has previously authorized payment for address update operations (e.g., by setting an "authorize payment" field in a modified preference options section of the email program), the email program attaches a payment authorization to this initial message. In this way, the modified email program avoids the need for an extra round of email messages between the address-change server and the sender's computer.

The address change server proceeds as noted above to determine an updated email address for the recipient, except that it does not need to send a message to the sender's computer to ask for payment. Assuming that the owner of the old email address has left money in an account with the address-change server, then the address-change server debits this account and discards the payment information received from the sender. In other words, when using an email program modified in accordance with the preferred embodiment, the sender does not risk anything by sending the payment information immediately instead of waiting until asked for payment authorization.

After performing the steps described above for determining whether the address-change server has an updated email address for the recipient, the address-change server returns either a message saying that no forwarding email address could be found or it returns a message with the recipient's new email address (step 409). In the first case, the sender email program appends the original error message to the sender's list of unread email together with an indication that no forwarding email address was found by the address-change server (step 413). Similarly, if no reply is received from the address-change server within a threshold amount of time (e.g., 10 minutes), the system appends the error message to the sender's list of unread email so that the sender can handle the problem manually (e.g., by calling the recipient to determine the recipient's new email address) (step 413).

In the second case, the sender's email program constructs a new email message containing the content of the sender's original email message but addressed to the new email address of the recipient (step 415). The sender's email program transmits the new message to the recipient's new email address (step 417). For example, the sender's email program may display a dialog box to the sender which states that the message could not be delivered to the recipient's old email address but that a forwarding email address was found and asks the sender whether the message should be sent to the new email address. If the sender clicks the "YES" button, then the message is sent to the new email address. Those of ordinary skill will understand that alternative embodiments of the present invention could be developed which automatically (i.e., without the sender's approval) send out the new email message addressed to the recipient's new email address.

In yet another embodiment, the dialog box also contains a checkbox (default: checked) asking the sender whether the sender's personal productivity applications (e.g., the sender's address book) should be updated with the new email address of the recipient. If the sender leaves this checkbox checked, and if the old email address was in the sender's address book, then the sender's email program also updates the sender's address book file. If the recipient's old email address was not in the sender's address book then it is added to the senders address book.

Figure 5:
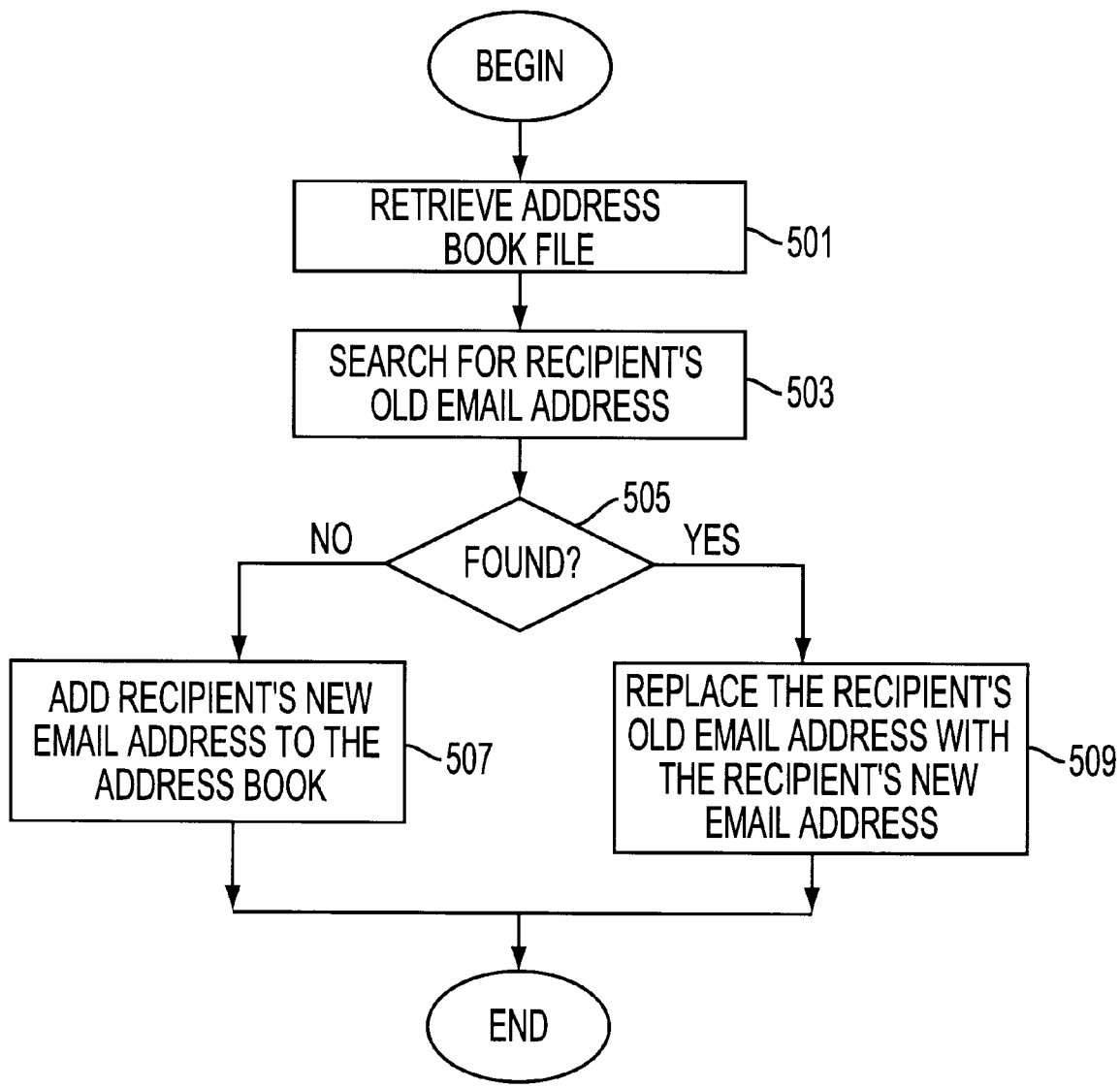
FIG. 5 illustrates the preferred steps for updating the sender's address book with the recipient's new email address.

FIG. 5 illustrates the preferred steps for updating the sender's address book with the recipient's new email address. In step 501 the method retrieves the sender's address-book. In step 503, the method searches the retrieved address-book for the recipient's old email address. If not found (step 505), the method adds the recipient's new email address to the address-book (step 507). If found (step 505), the method replaces the recipients old email address with the recipient's new email address (step 509). Upon completion of steps 507 or 509, processing ends in the method of FIG. 5.

One benefit of the preferred embodiment is that the address-change server will still work to forward an email addressed using the recipients old email address to an updated email address even if the sender has an old email system that has not yet been updated to interact with the address-change server automatically. The sender merely reads the server's email message manually and performs a copy-paste operation of the updated email address information into a header section of a new email message. The sender then resends the new email message.

While specific embodiments have been described herein for purposes of illustration, various modifications may be made without departing from the spirit and scope of the invention. For example, those of ordinary skill will understand that an embodiment of the present invention could be implemented which does not charge the recipient or the sender for an email update/forwarding operation.

In yet another embodiment, the functionality of the address-change server could be provided by more than one server. In such an embodiment, the sender sends different messages to different servers. For example, a message to enter a change of email address might be sent to newinfo@addresschange.com and a message to find out the new email address of a person might be sent to mailfinder@addresschange.com. Splitting the functionality between various servers reduces the load on any one server and therefore improves system responsiveness and throughput.

Accordingly, the invention is not limited to the above described embodiments, but instead is defined by the appended claims in light of their full scope of equivalents.

What is claimed is:

1. A method executed in a computer system for updating a recipient's email address, the method comprising the steps of:
   receiving at an address-change server an update message from a recipient; and
   storing information from the update message at the address-change server, the information comprising the recipient's new email address and the recipient's old email address.

2. A method executed in a computer system for updating a recipient's email address, the method comprising the steps of:
   receiving at an address-change server an update message from a recipient;
   storing information from the update message at the address-change server, the information comprising the recipient's new email address; and
   sending an email to the recipient's new email address which informs the recipient that the recipient's email address information has been updated at the address-change server.

3. A method executed in a computer system for updating a recipient's email address, the method comprising the steps of:
   receiving at an address-change server an update message from a recipient;
   storing information from the update message at the address-change server, the information comprising the recipient's new email address; and
   when authentication information associated with the update message is not received at the address-change server, sending an email to the recipient's old email address which informs the recipient that the recipient's email address information has been updated at the address-change server.

4. A method executed in a computer system for updating a recipient's email address, the method comprising the steps of:
   receiving at an address-change server an update message from a recipient;
   storing information from the update message at the address-change server, the information comprising the recipient's new email address; and
   when authentication information associated with the update message is received at the address-change server, checking the authentication information to determine that the recipient sent the update message.

5. The method of claim 4 further comprising the steps of:
   when the authentication check indicates that the recipient did not send the update message,
      removing from the address-change server the information retrieved from the update message; and
      sending an email message to the recipient's old email address regarding receipt of the update message and the indication from the authentication check.

6. A method executed in a computer system for informing a sender of a recipient's updated email address, the method comprising the steps of:
   receiving at the address-change server an email message from the sender which requests the updated email address of the recipient;
   retrieving the recipient's old email address from the email message;
   searching for the recipient's new email address using the recipient's old email address; and
   when the search finds the recipient's new email address, sending an email to the sender with the recipient's new email address.

7. The method of claim 6 wherein the step of searching further comprises the step of:
   performing a transitive closure operation using the recipient's old email address.

8. A method in an improved email program which facilitates reaching a recipient at a new email address, the method executing in a computer system and comprising the steps of:

receiving an error email message indicating that a recipient is unreachable;

sending an update request email message to an address-change server;

receiving a reply email message from the address-change server, the reply message containing information regarding the recipient's new email address; and sending a modified email message to the recipient at the recipient's new email address.

9. A method executed in a computer system for updating information associated with a user's program, the method comprising the steps of:

receiving a recipient's updated email address and the recipient's old email address from an address-change server;

retrieving the user's program; and updating the recipient's email address in the user's program.

10. A computer program product for updating a recipient's email address information from an old email to a new email address, the computer program product comprising:

code that receives at an address-change server an update message from a recipient;

code that stores information from the update message at the address-change server, the information comprising the recipient's new email address and the recipient's old email address; and a computer readable medium that stores the code.

11. The computer program product of claim 10 comprising:

when the authentication check indicates that the recipient did not send the update message, code that removes from the address-change server the information retrieved from the update message; and code that sends an email message to the recipient's old email address regarding receipt of the update message and the indication from the authentication check.

12. A computer program product for updating a recipient's email address information from an old email address to a new email address, the computer program product comprising:

code that receives at an address-change server an update message from a recipient;

code that stores information from the update message at the address-change server, the information comprising the recipient's new email address;

a computer readable medium that stores the code; and code that sends an email to the recipient's new email address which informs the recipient that the recipient's email address information has been updated at the address-change server.

13. A computer program product for updating a recipient's email address information from an old email to a new email address, the computer program product comprising:

code that receives at an address-change server an update message from a recipient;

code that stores information from the update message at the address-change server, the information comprising the recipient's new email address;

a computer readable medium that stores the code; and code that sends an email to the recipient's old email address which informs the recipient that the recipient's email address information has been updated at the address-change server, when authentication information associated with the update message is not received at the address-change server.

14. A computer program product for updating a recipient's email address information from an old email to a new email address, the computer program product comprising:

code that receives at an address-change server an update message from a recipient;

code that stores information from the update message at the address-change server, the information comprising the recipient's new email address;

a computer-readable medium that stores the code; and code the checks the authentication information to determine whether the recipient sent the update message, when authentication information associated with the update message is received at the address-change server.

15. A computer program product for informing a sender of a recipient's updated email address, the computer program product comprising:

code that receives at the address-change server an email message from the sender which requests the updated email address of the recipient;

code that retrieves the recipient's old email address from the email message;

code that searches for the recipient's new email address using the recipient's old email address;

code that sends an email to the sender with the recipient's new email address, when the search finds the recipient's new email address; and a computer-readable medium that stores the code.

16. The computer program product of claim 15 wherein the code that searches further comprises:

code that performs a transitive closure operation using the recipient's old email address.

17. A computer program product which facilitates reaching a recipient at a new email address, the computer program product comprising:

code that receives an error email message indicating that a recipient is unreachable;

code that sends an update request email message to an address-change server;

code that receives a reply email message from the address-change server, the reply message containing information regarding the recipient's new email address;

code that sends a modified email message to the recipient at the recipient's new email address; and a computer-readable medium that stores the code.

18. A computer program product for updating information associated with a user's program, the computer program product comprising:

code that receives a recipient's updated email address and recipient's old email address from an address-change server;

code the retrieves the user's program;

code that updates the recipient's email address in the user's program; and a computer-readable medium that stores the code.

19. An apparatus for updating a recipient's email address information from an old email address to a new email address, the apparatus comprising:

a mechanism configured to receive at an address-change server an update message from a recipient; and a mechanism configured to store information from the update message at the address-change server, the information comprising the recipient's new email address and the recipient's old email address.

20. A The apparatus of claim 19 comprising:

when the mechanism configured to perform the authentication check determines that the recipient did not send the update message, a mechanism configured to remove from the address-change server the information retrieved from the update message; and a mechanism configured to send an email message to the recipient's old email address regarding receipt of the update message and the indication from the authentication check.

21. An apparatus for updating a recipient's email address information from an old email address to a new email address, the apparatus comprising:

a mechanism configured to receive at an address-change server an update message from a recipient;

a mechanism configured to store information from the update message at the address-change server, the information comprising the recipient's new email address; and a mechanism configured to send an email to the recipient's new email address which informs the recipient that the recipient's email address information has been updated at the address-change server.

22. An apparatus for updating a recipient's email address information from an old email address to a new email address, the apparatus comprising:

a mechanism configured to receive at an address-change server an update message from a recipient;

a mechanism configured to store information from the update message at the address-change server, the information comprising the recipient's new email address; and a mechanism configured to send an email to the recipient's old email address which informs the recipient that the recipient's email address information has been updated at the address-change server, when authentication information associated with the update message is not received at the address-change server.

23. An apparatus for updating a recipient's email address information from an old email address to a new email address, the apparatus comprising:

a mechanism configured to receive at an address-change server an update message from a recipient;

a mechanism configured to store information from the update message at the address-change server, the information comprising the recipient's new email address; and a mechanism configured to check the authentication information to determine whether the recipient sent the update message, when authentication information associated with the update message is received at the address-change server.

24. An apparatus for informing a sender of a recipient's updated email address, the apparatus comprising:

a mechanism configured to receive at the address-change server an email message from the sender which requests the updated email address of the recipient;

a mechanism configured to retrieve the recipient's old email address from the email message;

a mechanism configured to search for the recipient's new email address using the recipient's old email address; and a mechanism configured to send an email to the sender with the recipient's new email address, when the search finds the recipient's new email address.

25. The apparatus of claim 24 wherein the mechanism configured to search further comprises:

a mechanism configured to perform a transitive closure operation using the recipient's old email address.

26. An apparatus which facilitates reaching a recipient at a new email address, the apparatus comprising:

a mechanism configured to receive an error email message indicating that a recipient is unreachable;

a mechanism configured to send an update request email message to an address-change server;

a mechanism configured to receive a reply email message from the address-change server, the reply message containing information regarding the recipient's new email address; and a mechanism configured to send a modified email message to the recipient at the recipient's new email address.

27. An apparatus for updating information associated with a user's program, the apparatus comprising:

a mechanism configured to receive a recipient's updated email address and recipient's old email address from an address-change server;

a mechanism configured to retrieve the user's program; and a mechanism configured to update the recipient's email address in the user's program.

* * * * *

UNITED STATES PATENT AND TRADEMARK OFFICE
CERTIFICATE OF CORRECTION

PATENT NO. : 6,405,243 B1
DATED : June 11, 2002
INVENTOR(S) : Jakob Nielsen

It is certified that error appears in the above-identified patent and that said Letters Patent is hereby corrected as shown below:

<u>Title page,</u>
Item [*] Notice, delete "0" and insert -- 793 --.

Signed and Sealed this

Twenty-third Day of March, 2004

JON W. DUDAS
*Acting Director of the United States Patent and Trademark Office*